(12) United States Patent
Namiki

(10) Patent No.: US 10,960,550 B2
(45) Date of Patent: Mar. 30, 2021

(54) IDENTIFICATION CODE READING APPARATUS AND MACHINE LEARNING DEVICE

(71) Applicant: FANUC CORPORATION, Yamanashi (JP)

(72) Inventor: Yuta Namiki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 135 days.

(21) Appl. No.: 16/150,430

(22) Filed: Oct. 3, 2018

(65) Prior Publication Data

US 2019/0099892 A1 Apr. 4, 2019

(30) Foreign Application Priority Data

Oct. 4, 2017 (JP) .............................. JP2017-194037

(51) Int. Cl.
| | | |
|---|---|---|
| *B25J 9/16* | (2006.01) | |
| *G06N 3/04* | (2006.01) | |
| *G06K 7/14* | (2006.01) | |
| *G06N 3/08* | (2006.01) | |
| *G06N 20/00* | (2019.01) | |
| *B25J 9/02* | (2006.01) | |
| *G06N 5/04* | (2006.01) | |

(52) U.S. Cl.
CPC .............. *B25J 9/1697* (2013.01); *B25J 9/02* (2013.01); *G06K 7/1404* (2013.01); *G06K 7/1408* (2013.01); *G06N 3/0454* (2013.01); *G06N 3/08* (2013.01); *G06N 5/04* (2013.01); *G06N 20/00* (2019.01); *G06N 3/0481* (2013.01)

(58) Field of Classification Search
CPC combination set(s) only.
See application file for complete search history.

(56) References Cited

U.S. PATENT DOCUMENTS 7,474,212 B2 * 1/2009 Nakagawa ............. B65G 61/00
235/38
9,881,349 B1 * 1/2018 Meier ................... G06K 9/4671
(Continued)

FOREIGN PATENT DOCUMENTS

| EP | 3421172 A1 | 1/2019 |
|---|---|---|
| JP | 2017-059266 A | 3/2017 |

(Continued)

OTHER PUBLICATIONS

English translation for reference WO2017145349 (Year: 2017).*
Notice of Reasons for Refusal for Japanese Application No. 2017-194037, dated Oct. 8, 2019, with translation, 6 pages.

*Primary Examiner* — Rachid Bendidi
(74) *Attorney, Agent, or Firm* — RatnerPrestia

(57) ABSTRACT

An identification code reading apparatus includes a machine learning device for learning estimation of an ideal image of an identification code with respect to an image of the identification code read by the visual sensor. The machine learning device observes read image data related to an image of the identification code read by the visual sensor as a state variable representing a current state of an environment, and acquires ideal image data related to the ideal image of the identification code as label data. Then, the machine learning device learns the read image data and the ideal image data in association with each other using the observed state variable and the acquired label data.

6 Claims, 5 Drawing Sheets

(56) References Cited

U.S. PATENT DOCUMENTS

| | | | |
|---|---|---|---|
| 2007/0069026 A1* | 3/2007 | Aoyama | G06K 7/14 |
| | | | 235/462.09 |
| 2015/0160653 A1* | 6/2015 | Cheatham, III | G05D 1/0088 |
| | | | 701/23 |
| 2017/0243097 A1* | 8/2017 | Loy | G06K 19/0614 |

FOREIGN PATENT DOCUMENTS

| | | | |
|---|---|---|---|
| WO | 2017145349 A1 | 8/2017 | |
| WO | WO-2017145349 A1 * | 8/2017 | B23P 19/10 |

\* cited by examiner

IDENTIFICATION CODE READING APPARATUS AND MACHINE LEARNING DEVICE

CROSS-REFERENCE TO RELATED APPLICATION

This application is a new U.S. Patent Application that claims benefit of Japanese Patent Application No. 2017-194037, filed Oct. 4, 2017, the disclosure of this application is being incorporated herein by reference in its entirety for all purposes.

BACKGROUND OF THE INVENTION

1. Field of the Invention

The present invention relates to an identification code reading apparatus and a machine learning device.

2. Description of the Related Art

Examples of a method of assigning an identification code such as a one-dimensional barcode, a QR code (registered trademark), or a data matrix to a surface of a product include a scheme of attaching a label printed with an identification code to the surface of the product and a direct marking scheme in which an identification code is directly engraved on the surface of the product using a printer, a laser marker, a drill, etc.

In general, the identification code assigned to the surface of the product is read using a visual sensor, etc. FIG. 6 is a diagram illustrating an example of a robot capable of assigning an identification code to the surface of the product and reading the identification code assigned to the surface of the product.

When an identification code is assigned to a product 50, a robot controller 2 instructs a robot 5 to move an identification code assigning device 3 to a predetermined position of the product 50, and instructs the identification code assigning device 3 to assign the identification code to the predetermined position of the product 50. Then, the identification code assigning device 3 acquires a shape of the identification code from the identification code generating apparatus 6, and the identification code assigning device 3 assigns the identification code to a surface of the product 50. In addition, when the identification code assigned to the product 50 is read, the robot controller 2 instructs the robot 5 to move the visual sensor 4 to the predetermined position of the product 50, and instructs an identification code reading apparatus 1 to read the identification code assigned to the product 50. Then, the identification code reading apparatus 1 reads the identification code assigned to the surface of the product 50 via the visual sensor 4. In FIG. 6, reference numeral 51 denotes a work table on which the product 50 is placed.

However, in reading the identification code assigned to the surface of the product, reading the identification code may fail due to various factors such as a case in which a place to which the identification code of the product is assigned is not flat and a case in which an angle at which light hits a position assigned with the identification code or a viewing position is inappropriate. An example of a conventional technology for solving such a problem is disclosed in Japanese Patent Application Laid-Open No. 2017-059266.

Examples of a case in which reading of the identification code assigned to the surface of the product fails include the following cases in which:

contract between a black cell (black bar) and a while cell (while bar) is low;

a black cell (black bar) and a white cell (while bar) are inverted and detected;

the shape of the identification code is distorted and detected due to a surface shape of the product, etc.

the identification code is formed with dents, drill holes, etc. and does not strictly meet a standard of the identification code, and a color, etc. of a part of the identification code is differently detected due to a cutting fluid, etc. adhering to the surface In the above-mentioned cases in which reading of the identification code fails, for the identification code assigned to the same product surface, a degree of reflection of an image detected by the visual sensor, etc. varies depending on the situation. However, the above-described conventional technology may not cope with various situations described above while being able to cope with a specific situation.

SUMMARY OF THE INVENTION

In this regard, an object of the present invention is to provide an identification code reading apparatus and a machine learning device capable of properly reading an identification code which is not suitable for reading.

In the present invention, the above-mentioned problem is solved by recovering an easily readable image from an image of an identification code unsuitable for reading using machine learning. A recovering method introduced in the present invention is realized by the following procedures.

Procedure 1: Determine a character string to be used as an identification code.

Procedure 2: Generate an ideal identification code from the character string and use the generated identification code as teacher data.

Procedure 3: Assign the identification code to a surface from which the identification code is actually read.

Procedure 4: Set images obtained by capturing the assigned identification code in various situations as input data.

Procedure 5: Collect a large number of pairs of the input data and the teacher data as learning data.

Procedure 6: Perform learning of a learning device using the learning data.

When an image of the identification code is input to the machine learning device progressing in learning through the above procedures, an image of the ideal identification code is output. Then, it is possible to easily read the identification code by decoding the image of the ideal identification code. Furthermore, similar operations can be performed on products of various materials and shapes to acquire learning data, thereby performing learning. In this way, it is possible to recover identification codes assigned to products of various materials and shapes in addition to a single material and shape.

An identification code reading apparatus according to an aspect of the present invention reads an identification code assigned to a surface of a product using a visual sensor, and includes a machine learning device that learns estimation of an ideal image of an identification code with respect to an image of the identification code read by the visual sensor. Further, the machine learning device includes a state observation unit for observing read image data related to an image of the identification code read by the visual sensor as a state variable representing a current state of an environment, a label data acquisition unit for acquiring ideal image data related to an ideal image of the identification code as label data, and a learning unit for learning the read image data and the ideal image data in association with each other using the state variable and the label data.

The identification code reading apparatus may include an image output unit that estimates and output an ideal image of the identification code from the read image data using a learning result of the learning unit. Further, the image output unit may estimate and output an ideal image of the identification code based on a plurality of ideal images of the identification code estimated from each of a plurality of read image data.

The state observation unit may further observe assignment state data related to a material of the product, a method of surface treatment, or a method of assigning an identification code as a state variable representing a current state of an environment.

The read image data may be obtained by controlling a robot in which the visual sensor is fixed to an arm distal end portion or the product is gripped by the arm distal end portion to read the identification code.

A machine learning device according to another aspect of the present invention learns estimation of an ideal image of an identification code with respect to an image of the identification code read by a visual sensor, and includes a state observation unit for observing read image data related to an image of an identification code read by the visual sensor as a state variable representing a current state of an environment, a label data acquisition unit for acquiring ideal image data related to an ideal image of the identification code as label data, and a learning unit for learning the read image data and the ideal image data in association with each other using the state variable and the label data.

According to the present invention, since an identification code unsuitable for reading may be recovered to an ideal identification code, it is possible to properly read an identification code which may not be read depending on the situation.

DETAILED DESCRIPTION OF THE PREFERRED EMBODIMENTS

Figure 1:
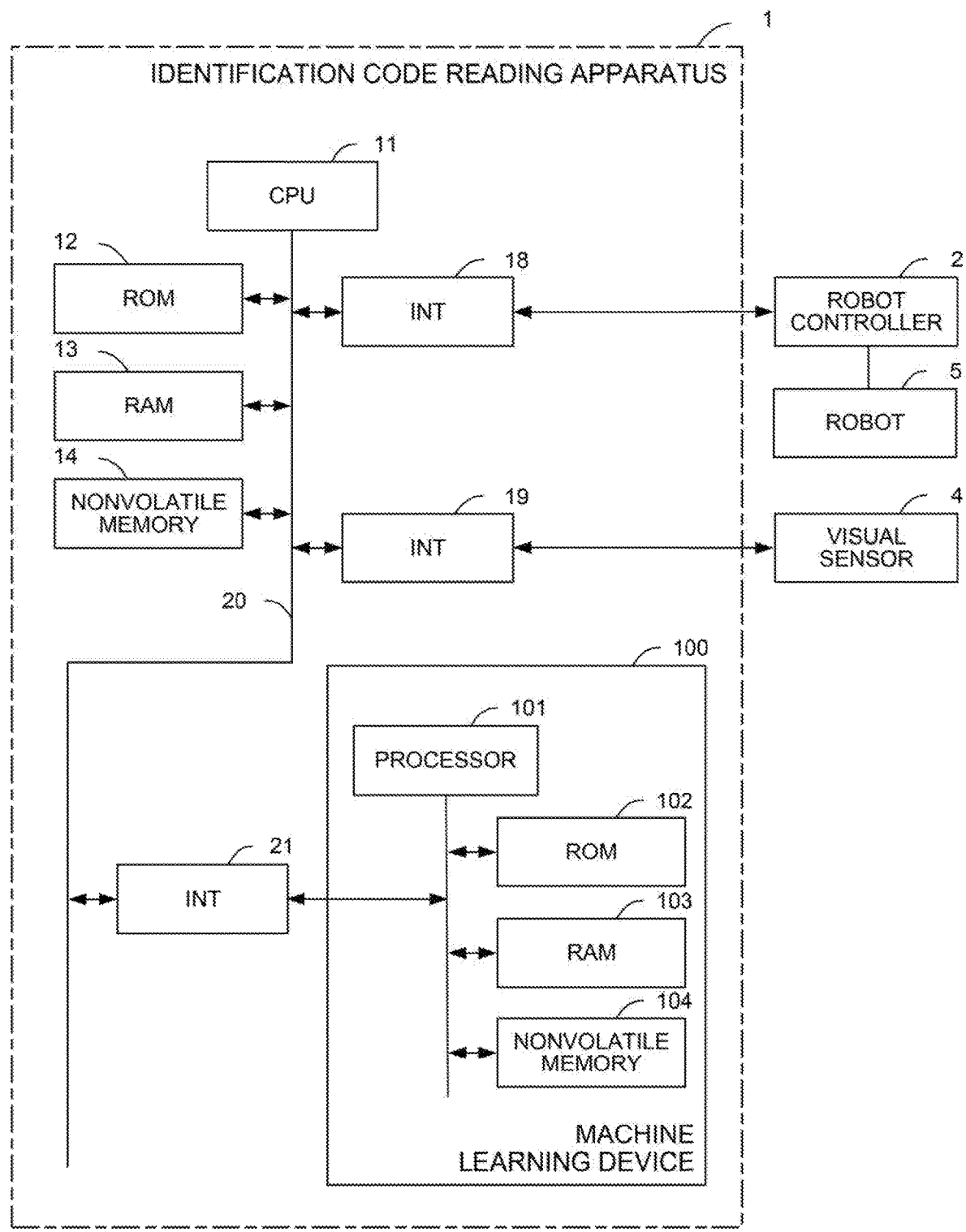
FIG. 1 is a schematic hardware configuration diagram of an identification code reading apparatus according to an embodiment.

FIG. 1 is a schematic hardware configuration diagram illustrating a main part of an identification code reading apparatus according to a first embodiment.

For example, the identification code reading apparatus 1 may be implemented as a computer such as a personal computer connected to a robot controller that controls a robot via an interface or a wired/wireless network. Alternatively, for example, the identification code reading apparatus 1 may be implemented as a server computer such as a cell computer, a host computer, or a cloud computer connected to the robot controller that controls the robot via an interface or a wired/wireless network.

A central processing unit (CPU) 11 included in the identification code reading apparatus 1 according to the present embodiment is a processor that controls the identification code reading apparatus 1 overall. The CPU 11 reads a system program stored in a read only memory (ROM) 12 via a bus 20, and controls the entire identification code reading apparatus 1 according to the system program. Temporary calculation data or display data, various data input by an operator via an input unit (not illustrated), etc. are temporarily stored in a random access memory (RAM) 13.

For example, a nonvolatile memory 14 is configured as a memory that is kept in a storage state even when a power source of the identification code reading apparatus 1 is turned OFF by being backed up by a battery (not illustrated). Various data, etc. input by the operator through an input device (not illustrated) is stored in the nonvolatile memory 14. The various data stored in the nonvolatile memory 14 may be loaded in the RAM 13 at the time of use. In addition, various system programs (including a system program for controlling exchange with a machine learning device 100, which will be described below) necessary for an operation of the identification code reading apparatus 1 are written to the ROM 12 in advance.

In response to an instruction from a robot controller 2 controlling a robot 5 via an interface 18, the identification code reading apparatus 1 reads the identification code by acquiring an image of the identification code from a visual sensor 4 via an interface 19.

An interface 21 is an interface for connecting the identification code reading apparatus 1 and the machine learning device 100 to each other. The machine learning device 100 includes a processor 101 that controls the entire machine learning device 100, a ROM 102 that stores a system programs, etc., a RAM 103 that performs temporary storage in each process related to machine learning, and a nonvolatile memory 104 used to store a learning model, etc. The machine learning device 100 can observe the image of the identification code, etc. read by the identification code reading apparatus 1 via the interface 21. Further, the identification code reading apparatus 1 performs decoding processing for analyzing an image of an ideal identification code output from the machine learning device 100.

Figure 2:
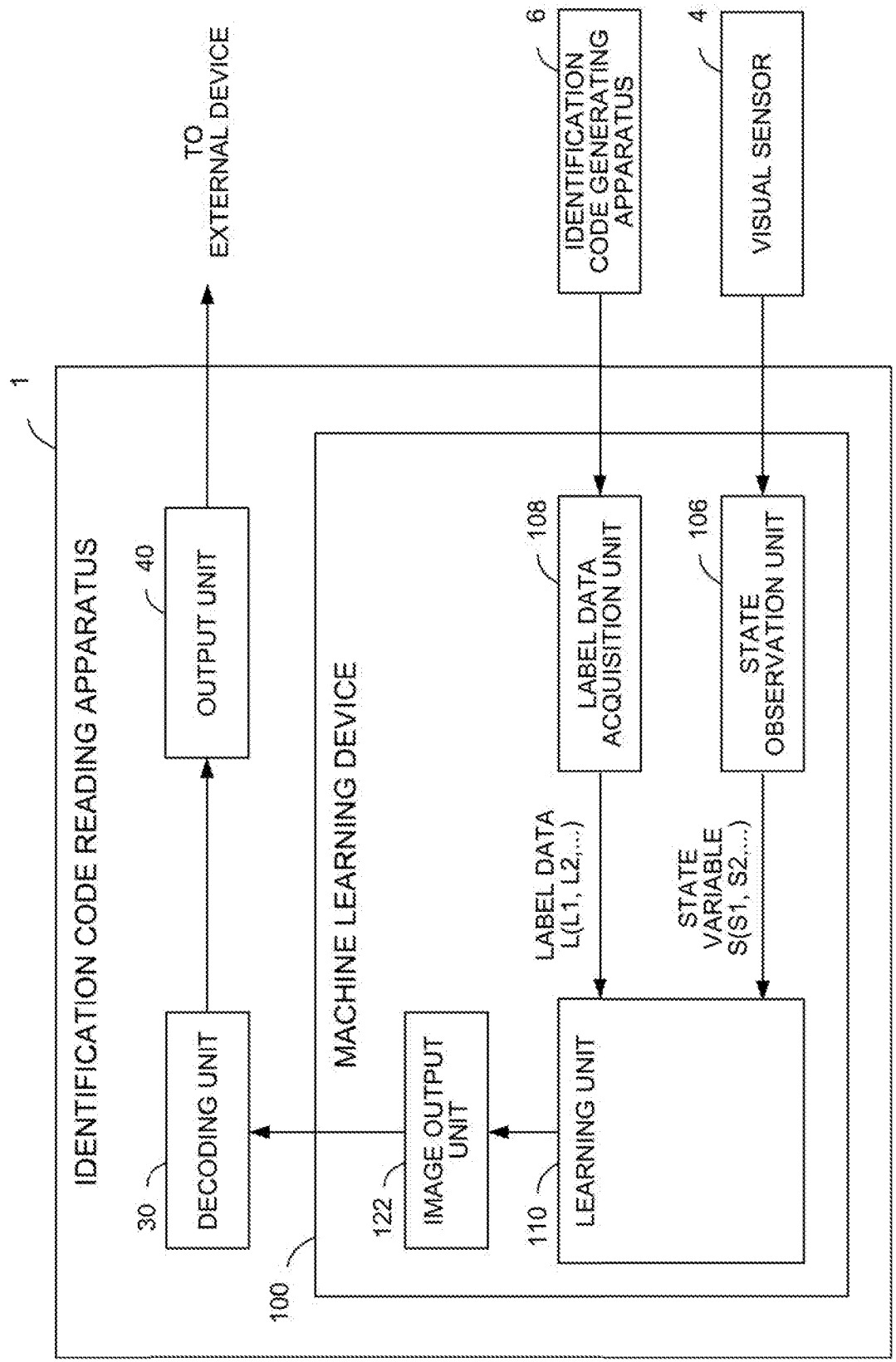
FIG. 2 is a schematic function block diagram of the identification code reading apparatus according to the embodiment.

FIG. 2 is a schematic function block diagram of the identification code reading apparatus 1 and the machine learning device 100 according to the first embodiment.

Each function block illustrated in FIG. 2 is implemented when each of the CPU 11 included in the identification code reading apparatus 1 and the processor 101 of the machine learning device 100 illustrated in FIG. 1 executes each system program and controls an operation of each unit of the identification code reading apparatus 1 and the machine learning device 100. The identification code reading apparatus 1 according to the present embodiment includes a decoding unit 30 and an output unit 40.

The decoding unit 30 decodes an original character string of the identification code by executing decoding processing corresponding to a type of the identification code on the image of the ideal identification code output from the machine learning device 100. General identification code decoding processing may be used as the decoding processing executed by the decoding unit 30 without change.

The output unit 40 outputs the character string decoded by the decoding unit 30 to an external device such as a display device.

Meanwhile, the machine learning device 100 included in the identification code reading apparatus 1 learns a model structure representing a relationship between the image of the identification code observed by the visual sensor 4 and the image of the ideal identification code. As illustrated by the function block in FIG. 2, the machine learning device 100 included in the identification code reading apparatus 1 includes a state observation unit 106 that observes the identification code observed by the visual sensor 4 as a state variable S including read image data S1 related to the image thereof, a label data acquisition unit 108 that acquires label data L including ideal image data L1 related to the ideal image of the identification code, a learning unit 110 that learns a correlation between the image of the read identification code and the image of the ideal identification code using the state variable S and the label data L, and an image output unit 122 that outputs an image of an ideal identification code estimated from an image of an identification code which is read using a learned model by the learning unit 110.

As the read image data S1 among state variables S observed by the state observation unit 106, it is possible to use image information obtained by controlling the robot 5 to read the identification code assigned to the surface of the product using the visual sensor 4, or it is possible to use image information obtained when the identification code assigned to the surface of the product is captured by another imaging means and acquired by the identification code reading apparatus 1 via an interface (not illustrated). The read image data S1 may be normalized such that the number of data items (number of pixels) is suitable as input data of the learning unit 110.

At the time of learning by the learning unit 110, the label data acquisition unit 108 acquires the ideal image data L1 related to the ideal image of the identification code as the label data L. For example, it is possible to use the image of the identification code generated by the identification code generating apparatus 6 as the ideal image data L1. Alternatively, for example, the ideal image data L1 may be generated as an ideal image from a character string, etc. corresponding to a source of the identification code. Alternatively, as the ideal image data L1, it is possible to use an image obtained by capturing the identification code assigned to the surface of the product by the visual sensor 4 mounted on the robot 5 in an ideal positional relationship and illumination state. The ideal image data L1 may be normalized such that the number of data items (number of pixels) is suitable as output data of the learning unit 110. The label data acquisition unit 108 is used at the time of learning by the learning unit 110, and may not be an indispensable component of the machine learning device 100 after learning by the learning unit 110 is completed.

In accordance with arbitrary learning algorithms collectively referred to as machine learning, the learning unit 110 learns the label data L (ideal image data L1 related to an ideal image of the identification code) with respect to the state variable S (read image data S1 related to the image of the identification code). For example, the learning unit 110 can learn a correlation between the read image data S1 included in the state variable S and the ideal image data L1 included in the label data L. The learning unit 110 can iteratively execute learning based on a data set including the state variable S and the label data L.

In learning by the learning unit 110, it is desirable to execute a plurality of learning cycles using a plurality of read image data S1 for one identification code. More specifically, the plurality of learning cycles using each of the plurality of read image data S1 captured under various conditions (including change of an angle of the visual sensor 4 with respect to the surface of the product, change of a light irradiation condition, change of a condition of contamination due to cutting fluid, etc.) for one identification code assigned to the surface of the product and the ideal image data L1 related to the identification code are executed. In addition, the plurality of learning cycles are executed for a different identification code.

By repeating such a learning cycle, the learning unit 110 automatically interprets a correlation between the image (read image data S1) obtained by reading the identification code assigned to the surface of the product using the visual sensor 4 and the ideal image (ideal image data L1) of the identification code. The correlation of the ideal image data L1 with respect to the read image data S1 is substantially unknown at a start of a learning algorithm. However, the correlation between the read image data S1 and the ideal image data L1 is gradually interpreted as the learning unit 110 progresses in learning, and it is possible to interpret the correlation of the ideal image data L1 with respect to the read image data S1 using a learned model obtained as a result thereof.

The image output unit 122 estimates an ideal image of identification data from an image of the identification data obtained from the visual sensor 4 based on a result (learned model) learned by the learning unit 110, and outputs the estimated ideal image of the identification data to the decoding unit 30. The image output unit 122 may estimate an ideal image of the identification data from one image of the identification code assigned to the surface of the product. In addition, the image output unit 122 may acquire a plurality of images (for example, a plurality of images captured by changing the angle of the visual sensor 4 with respect to the product) of the identification code assigned to the surface of the product, and compare ideal images of the identification data estimated from the plurality of respective images (for example, using majority logic, etc.) to estimate an ideal image of the identification data.

As a modification of the identification code reading apparatus 1, the state observation unit 106 may observe, as the state variable S, assignment state data S2 related to a material of the product, a method of surface treatment of the product, and a method of assigning an identification code to the surface of the product, in addition to the read image data S1. For example, such assignment state data S2 may be set in the nonvolatile memory 14, etc. via an input device (not illustrated) in advance by the operator, and the state observation unit 106 may acquire the assignment state data S2 by referring to the nonvolatile memory 14.

According to the modification, the machine learning device 100 can learn estimation of the ideal image of the identification code from the image of the identification code assigned to the surface of the product in consideration of the material to which the identification code is assigned, and thus can more accurately estimate the image of the ideal identification code.

Figure 3:
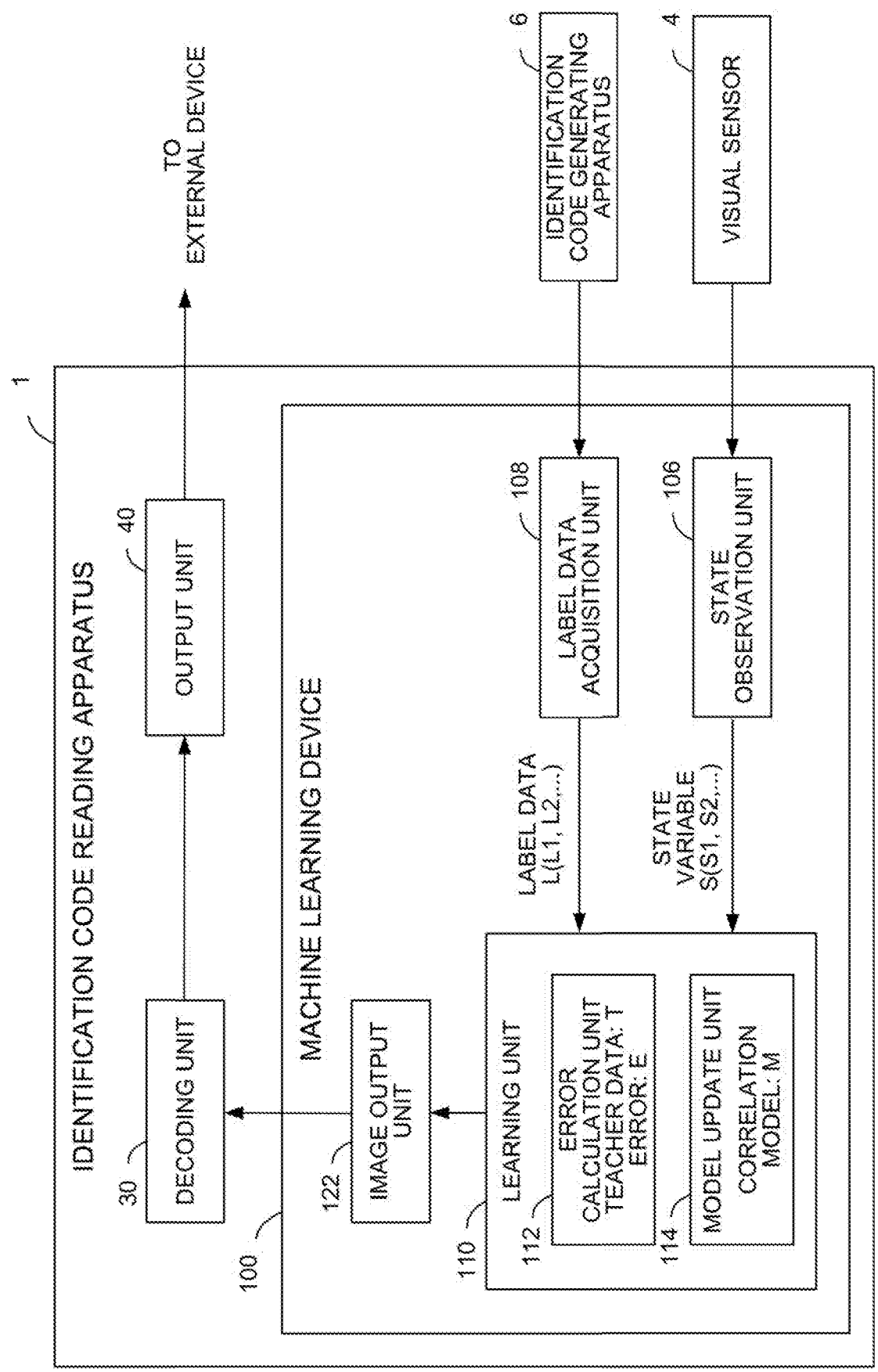
FIG. 3 is a schematic function block diagram of an identification code reading apparatus according to another embodiment.

In the machine learning device 100 having the above-described configuration, the learning algorithm executed by the learning unit 110 is not particularly limited, and it is possible to adopt a known learning algorithm as machine learning. FIG. 3 illustrates a configuration including a learning unit 110 that executes supervised learning as another example of the learning algorithm as another mode of the identification code reading apparatus 1 illustrated in FIG. 2. Supervised learning is a scheme of learning a correlation model for estimating a required output with respect to a new input by distinguishing a feature implying a correlation between an input and an output from teacher data when a known data set (referred to as teacher data) of an input and an output corresponding thereto is given.

In a machine learning device 100 included in an identification code reading apparatus 1 illustrated in FIG. 3, the learning unit 110 includes an error calculation unit 112 that calculates an error E between a correlation model M for estimating an ideal image of an identification code from an image obtained by reading an identification code assigned to a surface of a product included in a state variable S using a visual sensor 4 and a correlation feature distinguished from teacher data T obtained as an ideal image of an identification code, and a model update unit 114 that updates the correlation model M to reduce the error E. The learning unit 110 learns estimation of the ideal image of the identification code from the image obtained by reading the identification code assigned to the surface of the product by the model update unit 114 repeating update of the correlation model M using the visual sensor 4.

An initial value of the correlation model M is expressed, for example, by simplifying (for example, by a linear function) a correlation between the state variable S and (each pixel included in) the ideal image of the identification code, and is given to the learning unit 110 before supervised learning starts. In the embodiments, for example, the image of the identification code generated by the identification code generating apparatus 6 may be used as the teacher data T, and the teacher data T is given to the learning unit 110 at any time during operation at an early stage of the identification code reading apparatus 1. The error calculation unit 112 distinguishes the correlation feature implying the correlation between the image obtained by reading the identification code assigned to the surface of the product using the visual sensor 4 and the ideal image of the identification code using the teacher data T given to the learning unit 110 at any time, and obtains an error E between this correlation feature and the correlation model M corresponding to the state variable S and the label data L in a current state. The model update unit 114 updates, for example, the correlation model M such that the error E decreases according to a predetermined update rule.

In a subsequent learning cycle, the error calculation unit 112 estimates an ideal image of an identification code by using the state variable S according to a correlation model M after update, and obtains an error E between an estimation result and actually acquired label data L, and the model update unit 114 updates the correlation model M again. In this way, a correlation between a current state of an unknown environment and estimation of an image with respect thereto becomes gradually evident.

Figure 4A:
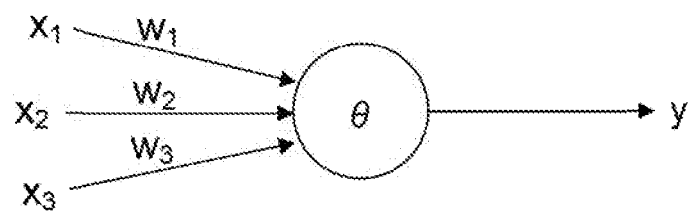
FIG. 4A is a diagram for description of a neuron.
Figure 4B:
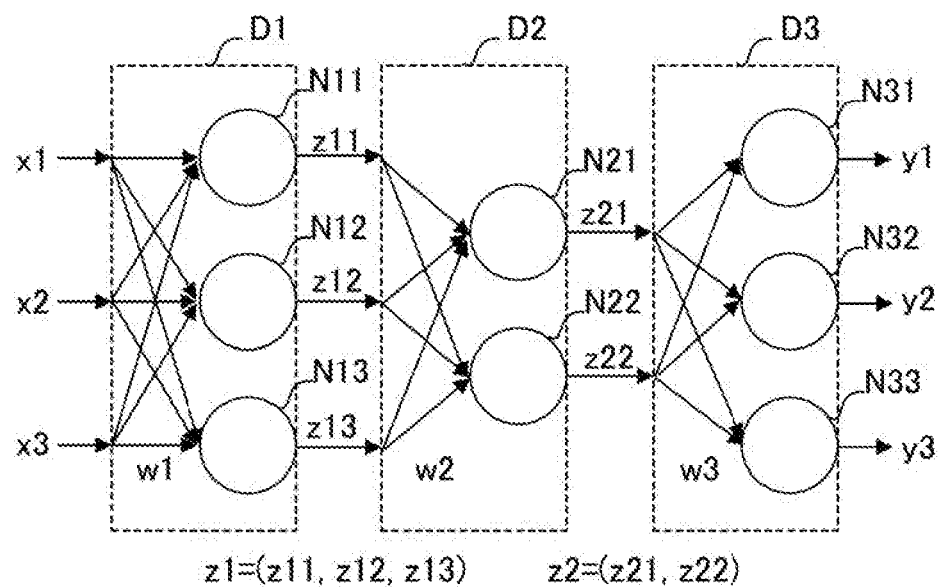
FIG. 4B is a diagram for description of a neural network.

A neural network may be used when proceeding with the supervised learning described above. FIG. 4A schematically illustrates a model of a neuron. FIG. 4B schematically illustrates a model of a three-layer neural network constructed by combining neurons illustrated in FIG. 4A. For example, the neural network can be constituted by an arithmetic unit, a storage unit, etc. imitating a model of a neuron.

The neuron illustrated in FIG. 4A outputs a result y for a plurality of inputs x (here, inputs $x_1$ to $x_3$ as an example). Each of the inputs $x_1$ to $x_3$ is multiplied by a weight w ($w_1$ to $w_3$) corresponding to this input x. As a result, the neuron outputs a result y expressed by the Equation (1) below. In Equation (1), the input x, the result y and the weight w are all vectors. In addition, θ is a bias and $f_k$ is an activation function.

$$y = f_k(\Sigma_{i=1}^n x_i w_i - \theta)$$

In the three-layer neural network illustrated in FIG. 4B, a plurality of inputs x (here, inputs $x_1$ to $x_3$ as an example) are input from a left side, and a result y (here, results $y_1$ to $y_3$ as an example) is output from a right side. In the illustrated example, each of the inputs $x_1$, $x_2$, and $x_3$ is multiplied by a corresponding weight (collectively represented as $w_1$), and each of the inputs $x_1$, $x_2$, and $x_3$ is input to three neurons N11, N12, N13.

In FIG. 4B, the respective outputs of the neurons N11 to N13 are collectively represented as z1. z1 can be regarded as a feature vector obtained by extracting feature quantities of input vectors. In the illustrated example, each of elements of the feature vector z1 is multiplied by a corresponding weight (collectively represented as w2), and each of the individual elements of the feature vector z1 is input to two neurons N21 and N22. The feature vector z1 represents a feature between the weight W1 and the weight W2.

In FIG. 4B, respective outputs of each of the neurons N21 to N22 are collectively represented by z2. z2 can be regarded as a feature vector obtained by extracting feature quantities of the feature vector z1. In the illustrated example, each of elements of the feature vector z2 is multiplied by a corresponding weight (collectively represented as w3), and each of the individual elements of the feature vector z2 is input to three neurons N31, N32, and N33. The feature vector z2 represents a feature between the weight W2 and the weight W3. Finally, the neurons N31 to N33 output results y1 to y3, respectively.

It is possible to use a so-called deep learning method using a convolutional neural network (including CNN: Convolutional Neural Network) that forms three or more layers.

In the machine learning device 100 provided in the identification code reading apparatus 1, the learning unit 110 may perform calculation of a multilayer structure according to the above-described neural network using the state variable S as the input x, thereby estimating each pixel value (result y) of the image of the ideal identification code from a value (input x) of each pixel of the image of the identification code acquired from the visual sensor 4. An operation mode of the neural network includes a learning mode and a value prediction mode. For example, the weight w may be learned using a learning data set in the learning mode, and a value of an action may be determined in the value prediction mode using the learned weight w. In the value prediction mode, it is possible to perform detection, classification, inference, etc.

The configuration of the machine learning device 100 described above can be described as a machine learning method (or software) executed by a processor 101. This machine learning method is a machine learning method for learning estimation of an image of an ideal identification code from the image of the identification code acquired from the visual sensor 4, and includes a step of observing an image (read image data S1) obtained by reading the identification code assigned to the surface of the product by using the visual sensor 4, as the state variable S representing the current state, a step of acquiring an ideal image (ideal image data L1) of the identification code as label data L, and a step of learning the read image data S1 and the ideal image data L1 in association with each other using the state variable S and the label data L performed by the processor 101.

The learned model learned and obtained by the learning unit 110 of the machine learning device 100 may be used as a program module which is a part of software related to machine learning. The learned model of the embodiments can be used in a computer including a processor such as a CPU or a graphic processing unit (GPU) and a memory. More specifically, the processor of the computer calculates the image of the identification code assigned to the surface of the product as an input in accordance with an instruction from the learned model stored in the memory, and operates to output an estimation result of the ideal image of the identification code based on a calculation result. The learned model of the embodiments can be used by being duplicated to another computer via an external storage medium, a network, etc.

In addition, when the learned model of the embodiments is duplicated to another computer and used in a new environment, further learning may be performed with respect to the learned model based on a new state variable or determination data obtained in the environment. In such a case, it is possible to obtain a learned model derived from the learned model (hereinafter referred to as a derived model) based on the environment.

The derived model of the embodiments is the same as the original learned model in that the estimation result of the ideal image of the identification code is output from the image of the identification code assigned to the surface of the product, and is different from the original learned model in that a more suitable result for the new environment than that in the original learned model is output. This derived model can also be used by being duplicated to another computer via an external storage medium, a network, etc.

Further, a learned model obtained by performing learning from the beginning in another machine learning device (hereinafter referred to as a distillation model) may be created using an output obtained with respect to an input to the machine learning device incorporating the learned model of the embodiments, and used (such a learning process is referred to as "distillation"). In distillation, the original learned model is referred to as a teacher model, and the newly created distillation model is also referred to as a student model. In general, the distillation model is smaller in size than the original learned model. However, the distillation model may provide the same accuracy as that of the original learned model, and thus is more suitable for distribution to another computer via an external storage medium, a network, etc.

Figure 5:
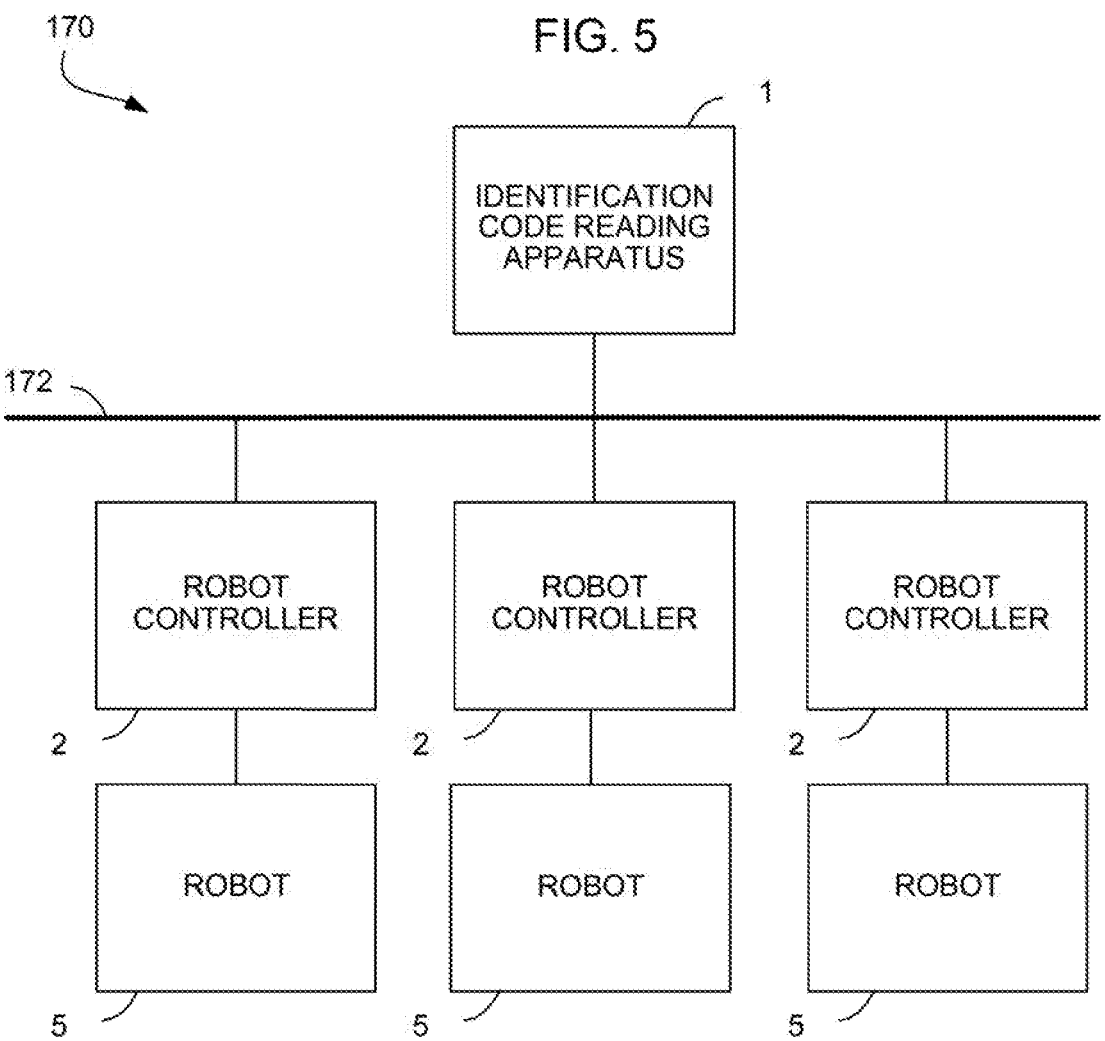
FIG. 5 is a schematic function block diagram illustrating a mode of a system incorporating the identification code reading apparatus.

FIG. 5 illustrates a system 170 according to an embodiment having a plurality of robot controllers 2, each of which controls the robot 5 including the visual sensor 4 (not illustrated).

The system 170 includes the identification code reading apparatus 1, the plurality of robot controllers 2, each of which controls the robot 5 including at least the visual sensor 4, and a wired/wireless network 172 for connecting the identification code reading apparatus 1 and the robot controllers 2 to each other. Instead of attaching the visual sensor 4 to a tip of a hand of the robot (either fixedly or by gripping using an arm), it is possible to adopt a configuration in which the visual sensor 4 is fixedly installed at any position, and the product is gripped by the hand of the robot.

In the system 170 having the above-described configuration, a relationship between the image of the identification code read by the visual sensor 4 of each robot 5 (and acquired via the robot controller 2) and the ideal image of the identification code may be learned by the learning unit 110 of the machine learning device 100 included in the identification code reading apparatus 1, and an ideal image of the identification code may be automatically and accurately estimated from the image of the identification code read by the visual sensor 4 of each robot 5 using a learning result. According to such a configuration of the system 170, it is possible to acquire a more diverse data set (including the state variable S) via the plurality of robot controllers 2, and to improve a speed and reliability of learning of the relationship between the image of the identification code read by the visual sensor 4 of each robot 5 and the ideal image of the identification code using the acquired data set as an input.

The system 170 may be configured to mount the identification code reading apparatus 1 as a cloud server, etc. connected to the network 172. According to this configuration, regardless of a location or timing at which each of the plurality of robot controllers 2 is present, it is possible to connect (robot controllers 2 that control robots 5 including) a necessary number of visual sensors 4 to the machine learning device 100 as necessary.

Figure 6:
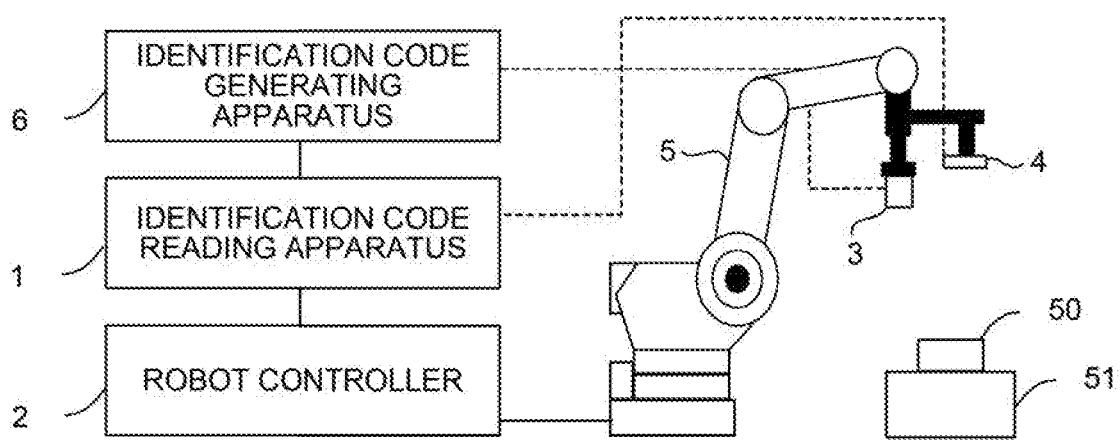
FIG. 6 is a schematic configuration diagram illustrating an example of an identification code reading apparatus according to a conventional technology.

It is possible to acquire a large number of sets of label data L by a state variable S using the robot. For example, a case in which the configuration of the embodiments is introduced to the robot controller 2 illustrated in FIG. 6 is considered. To assign an identification code to a product, the robot controller 2 instructs the robot 5 to move the identification code assigning device 3 to a predetermined position of the product 50. Then, the identification code assigning device 3 is instructed to assign the identification code to the product 50 at a predetermined position. The identification code assigning device 3 acquires an ideal shape of the identification code from the identification code generating apparatus 6, and the identification code assigning device 3 assigns the identification code to a surface of the product 50. In FIG. 6, the identification code assigning device 3 is attached (either fixedly or by gripping using an arm) to a tip of a hand of the robot. However, it is possible to adopt a configuration in which the identification code assigning device 3 is fixedly installed at any position, and the product 50 is gripped by the hand of the robot.

To read the identification code assigned to the product 50, the robot controller 2 instructs the robot 5 to move the visual sensor 4 to a predetermined position of the product 50, and instructs the identification code reading apparatus 1 to read the identification code assigned to the product 50. Then, the identification code reading apparatus 1 reads the identification code assigned to the surface of the product 50 via the visual sensor 4. It is possible to acquire a large number of sets of label data L by a state variable S by performing such processing on a plurality of products or a plurality of places of a product. Further, when the identification code is read, it is possible to acquire an image of the identification code under various conditions by changing a position of the visual sensor 4 or changing a type or brightness of the illumination to be used. In FIG. 6, even though the visual sensor 4 is attached (either fixedly or by gripping using an arm) to the tip of the hand of the robot, it is possible to adopt a configuration in which the visual sensor 4 is fixedly installed at any position and the product is gripped by the hand of the robot.

Even though the embodiments have been described above, the embodiments are not limited only to examples of the above-described embodiments, and can be implemented in various modes by making appropriate changes.

For example, the learning algorithm executed by the machine learning device 100, the arithmetic algorithm executed by the machine learning device 100, etc. are not limited to those described above, and various algorithms can be adopted.

In addition, in the above embodiments, a description has been given on the assumption that the identification code reading apparatus 1 and the machine learning device 100 are devices having different CPUs (processors). However, the machine learning device 100 may be realized by the CPU 11 included in the identification code reading apparatus 1 and the system program stored in the ROM 12.

In the above embodiments, the identification code assigned to the surface of the product is read by the robot. However, this operation may be performed by a hand of the operator having the visual sensor 4.

In addition, in the above embodiments, preprocessing other than normalization is not performed on the image of the identification code captured by the visual sensor 4. However, before estimation of the ideal image by the learning unit 110 is performed, the image may be converted such that a position, a posture, or a size of the identification code appearing in the image is the same as that of the ideal identification code.

The invention claimed is:

1. An identification code reading apparatus for reading an identification code assigned to a surface of a product using a visual sensor, the identification code reading apparatus comprising:
   a machine learning device for learning estimation of an ideal image of the identification code with respect to an image of the identification code read by the visual sensor,
   wherein the machine learning device includes a processor configured to:
      control positioning of the visual sensor relative to the identification code, or position the identification code relative to the visual sensor, and control the visual sensor to read the identification code,
      observe read image data related to the image of the identification code read by the visual sensor as a state variable representing a current state of an environment,
      acquire ideal image data related to the ideal image of the identification code as label data,
      learn the read image data and the ideal image data in association with each other using the state variable and the label data, and estimate and output the ideal image of the identification code from the read image data.

2. The identification code reading apparatus according to claim 1, wherein the processor is further configured to estimate and output the ideal image of the identification code based on a plurality of ideal images of the identification code estimated from each of a plurality of read image data.

3. The identification code reading apparatus according to claim 1, wherein the processor is further configured to observe assignment state data related to a material of the product, a method of surface treatment, or a method of assigning the identification code as a state variable representing a current state of an environment.

4. The identification code reading apparatus according to claim 1, wherein the visual sensor is fixed to an arm distal end portion or the product is gripped by the arm distal end portion to read the identification code.

5. A machine learning device for learning estimation of an ideal image of an identification code with respect to an image of the identification code read by a visual sensor, the machine learning device comprising:
   a processor configured to:
      control positioning of the visual sensor relative to the identification code, or position the identification code relative to the visual sensor, and control the visual sensor to read the identification code;
      observe read image data related to the image of an identification code read by the visual sensor as a state variable representing a current state of an environment;
      acquire ideal image data related to the ideal image of the identification code as label data;
      learn the read image data and the ideal image data in association with each other using the state variable and the label data; and
      estimate and output the ideal image of the identification code from the read image data.

6. A method for learning estimation of an ideal image of an identification code with respect to an image of the identification code read by a visual sensor, the method comprising:
   controlling, by a processor of a machine learning device, a robot to position the visual sensor relative to the identification code, or position the identification code relative to the visual sensor, and controlling the visual sensor to read the identification code;
   observing, by the processor of the machine learning device, read image data related to the image of the identification code read by the visual sensor as a state variable representing a current state of an environment;
   acquiring, by the processor of the machine learning device, ideal image data related to the ideal image of the identification code as label data;
   learning, by the processor of the machine learning device, the read image data and the ideal image data in association with each other using the state variable and the label data; and
   estimating and outputting, by the processor of the machine learning device, the ideal image of the identification code from the read image data.

\* \* \* \* \*